US009305089B2

(12) United States Patent
Weerasinghe

(10) Patent No.: US 9,305,089 B2
(45) Date of Patent: Apr. 5, 2016

(54) SEARCH ENGINE DEVICE AND METHODS THEREOF

(75) Inventor: Srilal Weerasinghe, Austin, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 610 days.

(21) Appl. No.: 12/632,965

(22) Filed: Dec. 8, 2009

(65) Prior Publication Data

US 2011/0137882 A1 Jun. 9, 2011

(51) Int. Cl.
*G06F 17/30* (2006.01)

(52) U.S. Cl.
CPC .................. *G06F 17/30864* (2013.01)

(58) Field of Classification Search
CPC combination set(s) only.
See application file for complete search history.

(56) References Cited

U.S. PATENT DOCUMENTS

| 6,189,002 | B1* | 2/2001 | Roitblat | |
| 6,505,196 | B2* | 1/2003 | Drucker et al. | 707/751 |
| 7,599,966 | B2 | 10/2009 | Dissett et al. | |
| 7,617,209 | B2* | 11/2009 | Whitman et al. | |
| 7,680,854 | B2* | 3/2010 | Hyder et al. | 707/710 |
| 7,912,852 | B1* | 3/2011 | McElroy | 707/769 |
| 2006/0161534 | A1* | 7/2006 | Carson et al. | 707/3 |
| 2006/0248081 | A1* | 11/2006 | Lamy | 707/7 |
| 2007/0174270 | A1* | 7/2007 | Goodwin et al. | 707/5 |
| 2008/0046312 | A1* | 2/2008 | Shany et al. | 705/14 |
| 2008/0103971 | A1* | 5/2008 | Lukose et al. | 705/40 |
| 2008/0222199 | A1* | 9/2008 | Tiu et al. | 707/104.1 |
| 2008/0243593 | A1* | 10/2008 | Ko et al. | 705/10 |
| 2009/0006333 | A1* | 1/2009 | Jones et al. | 707/3 |
| 2009/0077065 | A1* | 3/2009 | Song et al. | 707/5 |
| 2009/0157665 | A1 | 6/2009 | Larvet et al. | |
| 2010/0036797 | A1* | 2/2010 | Wong et al. | 706/55 |
| 2010/0125604 | A1* | 5/2010 | Martinez et al. | 707/784 |

* cited by examiner

*Primary Examiner* — Hosain Alam
*Assistant Examiner* — Thu Nga Nguyen
(74) *Attorney, Agent, or Firm* — Akerman LLP; Michael K. Dixon; Mammen (Roy) P. Zachariah, Jr.

(57) ABSTRACT

A search engine is operable to receive keyword information and semantic information that gives meaning and context to the keyword information. The search engine searches a keyword database with the keyword information to determine a set of links to web pages. The search engine also searches a semantic database with the semantic information, and ranks the set of web links based on the search.

19 Claims, 6 Drawing Sheets

Instructions:

Your Reponses are optional. Feel free to skip any questions that you do not want to answer.

1. Do you like to receive customized ads matched to your profile/preferences?
   ○ Yes
   ○ No

*(If the answer is 'no', please ignore the rest of the questionnaire. You might continue to receive random ads not relevant to your interests)* —— 402

2. Are you:
   ○ Male
   ○ Female

3. List all KEYWORDS that you would like to receive ads on: —— 404

[text box]

4. Your location: State ___ City ___ Zip _____

5. Your age:
   ○ Below 15
   ○ 15-29 yrs.
   ○ 30-44 yrs. —— 406
   ○ 45-55 yrs.
   ○ 55+ yrs.

6. Your annual household income?
   ○ Below $50,000
   ○ $50,000-$100,000
   ○ $100,000-$150,000 —— 408
   ○ $150,000+

SEARCH ENGINE DEVICE AND METHODS THEREOF

FIELD OF THE DISCLOSURE

The present disclosure generally relates to data networks, and more particularly relates to search engines for data networks.

BACKGROUND

Data networks, such as the Internet, allow a wide variety of information to be accessed. However, the volume of information available via a data network can render particular information difficult to locate in the network. For example, the number of web pages available via the Internet makes it difficult to determine which particular web pages include information relevant to a particular topic. One tool that can be employed to determine a set of web pages likely to include relevant information is a search engine.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 4 is a diagram of a user profile interface in accordance with one embodiment of the present disclosure.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
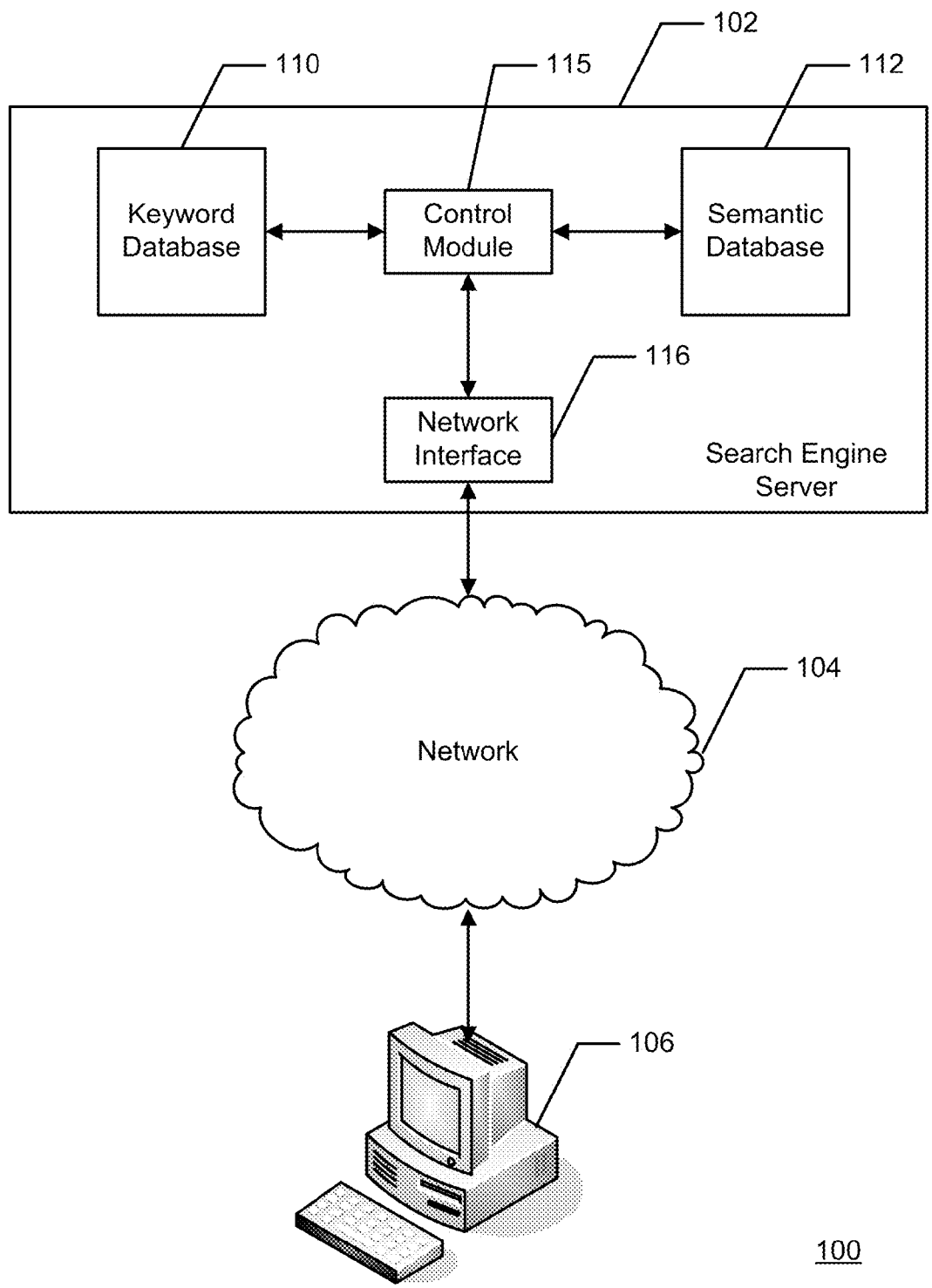
FIG. 1 is a block diagram illustrating a data network in accordance with one embodiment of the present disclosure.

FIG. 1 shows a data network 100 in accordance with one embodiment of the present disclosure. Data network 100 includes a search engine server 102 and a client device 106 each connected to a network 104. It will be appreciated that additional client devices and servers can be connected to the network 104, and the network 104 can itself include additional client devices, servers, and communications equipment configured to route communications between devices connected to the network. For purposes of discussion, it is assumed that the data network 100 is a wide area network, such as the Internet. In other embodiments, the data network 100 can be a local area network, or can include both wide area and local area networks. In addition, it is assumed for purposes of discussion that the client device 106 is a computer device, such as a desktop or laptop computer. In other embodiments, the client device 106 can be a phone device, such as a cell or mobile phone, a personal data assistant, game console, or other device able to access the network 104.

The search engine server 102 is a server device configured to provide a search engine service to a user of the client device 106. In particular, in response to a user entering a designated address via a browser program executing at the client device 106, the search engine server provides data that enables the browser to display a search interface page. In particular, the search interface page allows the user to enter one or more search terms. Upon the user actuating a keyboard button or an input icon, such as a software button, displayed at the search interface page, the client device 106 transmits the search terms to the search engine server 102 via the network 104.

The search terms include at least two kinds of info nation: keyword information and semantic information, including contextual information. Keyword information is information that is displayed at a web entity. For example, if the word "book" is displayed at a web page such that it is visible to a user, the word "book" is a keyword with respect to that web page. Semantic information is information that gives further meaning or context to a search but that is not displayed at the web entity. For example, semantic information might include information about the user that entered the search terms, such as the user's age, gender, occupation, or the like. The semantic information might also give further information about the search, such as that the user is only seeking books published after a particular date, or targeted to a particular age group. Semantic information thus allows a user to refine a search without unduly limiting the search via the use of additional keywords. As used herein, a web entity refers to any web object or web resource that can be identified by a Uniform Resource Identifier (URI). One example of a web entity is a web page that can be identified by a Uniform Resource locator. For purposes of discussion, it is assumed that the search engine server 102 is operable to provide links to web pages in response to a search. However, in other embodiments, the search engine server 102 is configured to determine all web entities relevant to a received set of search criteria, and can provide links to the determined entities as a set of search results.

The search engine server 102 includes a set of modules to execute a requested search, including a network interface 116, a control module 115, a keyword database 110, and a semantic database 112. The network interface 116 is a device configured to provide an interface to allow the control module 115 to transmit and receive information from the network 104. The control module 115 is a processor device, such as a general purpose or application specific processor, a computer device, or the like, configured to perform searches by accessing the keyword database 110 and the semantic database 112.

The keyword database 110 is a database that stores relationships between keywords and web addresses of web pages that display each keyword. For example, the database 110 stores information indicating the web addresses of web pages that display the word "book." The semantic database 112 stores semantic information indicating contextual information about web pages. For example, the semantic database 112 can store information indicating whether a particular web site is a commercial web site that sells products, a university or non-profit web site that provides informational services, a newspaper web site, or the like. The semantic database 112 can also store information indicating whether a web site is targeted to or more likely to appeal to a particular age group, gender, occupation, or the like.

In response to receiving search terms from the network 104, the control module 115 conducts a search of both the keyword database 110 and the semantic database 112. In particular, the control module 115 uses the keyword information included in the search terms to search the keyword database and determine a number of web pages relevant to the requested search. In addition, the control module 115 uses the semantic information in the search terms to search the semantic database and determine whether particular web pages having the keywords are more or less likely to be relevant to the search.

This can be better understood with reference to an example. In this example, it is assumed there are two web pages, termed Web Page A and Web Page B. Web Page A is targeted to adult women having medical questions about pregnancy. Web Page B is a web page having stories related to children, including a story wherein one of the characters is a pregnant adult woman. Each of Web Page A and Web Page B display the keywords "baby" and "pregnant." This example further assumes that control module 115 receives search terms including the key words "baby" and "pregnant" and also includes semantic information indicating the results of the search are intended to be viewed by a young child. In response to receiving the search terms, the control module 115 searches the keyword database 110 using the terms "baby" and "pregnant" and determines that both Web Page A and Web Page B are relevant to the search. In addition, the control module 115 searches the semantic database 112 with the semantic information indicating the age of the intended viewer of the web pages. In response, the semantic database 112 returns information to the control module 115 indicating that Web Page B is more likely to be relevant for a young viewer than Web Page A. Accordingly control module 115 determines that Web Page B is more relevant to the search than Web Page A.

In response to identifying web pages based on received search teems, the control module 115 communicates links to the identified web pages to the browser at client device 106. In an embodiment, the control module 115 communicates the links such that links that the control module 115 determines as more likely to be relevant are displayed more prominently than links determined less likely to be relevant. Thus, in the above example the control module communicates link information for Web Page A and Web Page B to client device 106 in such a way that Web Page B is displayed in a list in a rank order prior to the link for Web Page A. Accordingly, as illustrated, semantic information can be used to refine keyword web searches so that web pages more likely to be relevant to a particular search are more prominently displayed. Further, in an embodiment, the semantic search information is based on information purposely and actively entered by the user, rather than based on tracking of a user's web surfing habits, search history, or other tracked information. This improves user privacy, and allows the user to supply a wider range of semantic information for searches.

Control module 115 is also configured to compile and periodically update both keyword database 110 and semantic database 112. In particular, control module 115 can employ web crawlers or other programs to periodically trawl the network 104 for keyword and semantic information. This can be better understood with reference to FIG. 2, which illustrates web page code 262 in accordance with one embodiment of the present disclosure. Web page code 202 is stored at a server (not shown) located in the network 104, and communicated to a browser at a client device receiving a universal resource locator (URL) or other address information indicative of the code. Based on the web page code 202, the browser can display a web page associated with the code.

Figure 2:
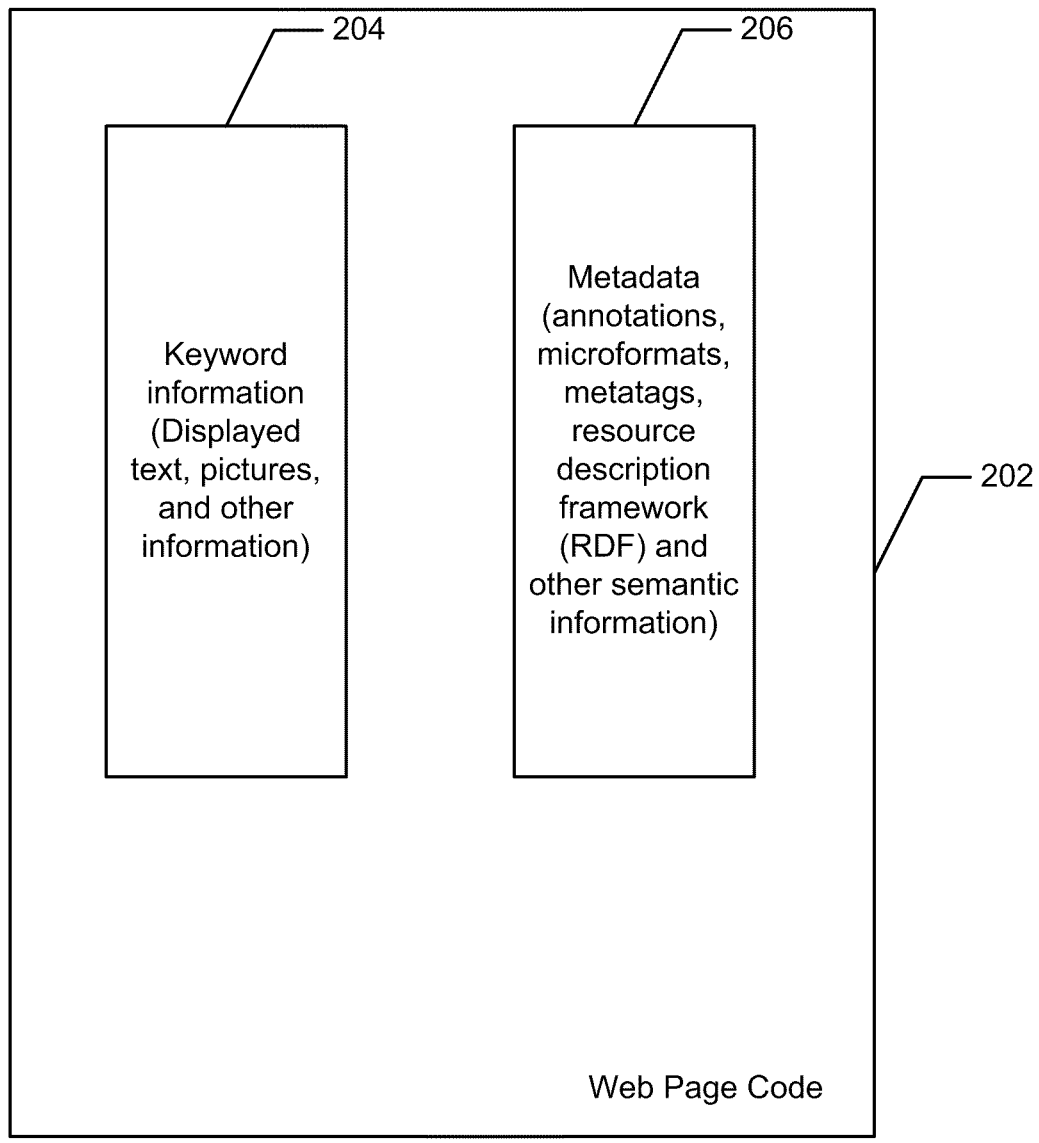
FIG. 2 is a block diagram of web entity code in accordance with one embodiment of the present disclosure.

In the illustrated embodiment of FIG. 2, the web page code 202 includes keyword information 204 and metadata 206. The keyword information includes information displayed at the web page associated with web page code 202. The metadata 206 includes semantic information that gives further meaning and context to the keyword information. In an embodiment, the metadata 206 is not displayed at the web page associated with web page code 202. The metadata 206 can include different kinds of semantic information, including annotations, microformats, metatags, and information entered in a Resource Description Framework language, or the like. An annotation refers to textual information that is generally compliant with the rules of syntax for normal communication, rather than compliant with a specialized language such as the Resource Description Framework language. Microformats, in contrast, are typically set forth in a syntax intended to be read an analyzed by a computer program.

A web crawler executing at control module 115 can access both the keyword information 204 and metadata 206. Based on changes to the keyword information 204, the web crawler updates the information for the web page associated with web page code 202 in keyword database 110. Similarly, based on changes to the metadata 206, the web crawler updates the information for the web page stored at semantic database 112.

It will be appreciated that the semantic database 112 can update semantic information for a particular web page based on metadata associated with a different web page. For example, the metadata for a particular web page, Web Page C, may indicate that the web page includes information about a particular movie star. Another web page, Web Page D, may include semantic or keyword information indicating that the movie star has recently starred in a particular movie. Based on information gathered by a web crawler for Web Page D, the control module 115 can update the semantic information for Web Page C to reflect that Web Page C may contain information relevant to searches for the movie identified by Web Page D. The semantic database 112 thus includes relational information for multiple web pages, improving the results of a semantic search. Searches of the semantic database therefore can determine a web page's relevancy to a particular search based both on metadata associated with the web page and on metadata associated with other web pages.

Figure 3:
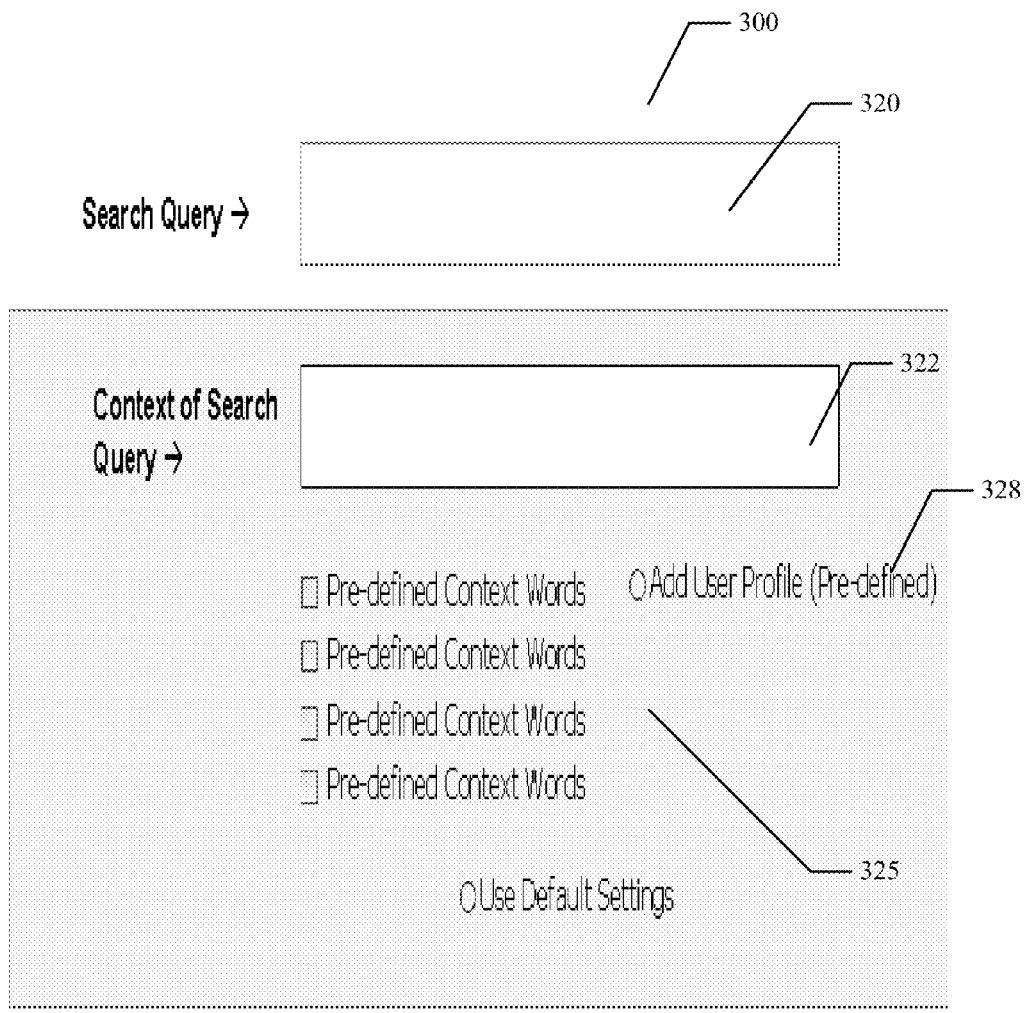
FIG. 3 is a diagram of a search engine user interface in accordance with one embodiment of the present disclosure.

FIG. 3 illustrates a search interface 300 displayed via a web page. The search interface 300 includes a text entry location 320 and a text entry location 322. As used herein, a text entry location refers to a portion of a web page that allows the user to enter textual information via a keyboard or other input device. The text entry location 320 is configured for entry of keyword information for a search, while the text entry location 322 is configured for entry of semantic information related to the keyword information to provide further meaning or context for the search.

The search interface 300 can be displayed at a client device, such as client device 106 of FIG. 1. The user can enter keyword information at text entry location 320 and semantic information for the search at text entry location 322. In response to the user actuating a button, such as the "Enter" key of a keyboard or a soft button (not shown) displayed at the search interface 300, the client device 106 communicates the keyword information and the semantic information as search terms to the search engine server 102. In response, the search engine server 102 performs a search as described herein. By providing different text entry locations for entry of keyword information and semantic information, the search interface 300 provides a convenient way for the user to separate keyword information and semantic information associated with a search. Thus, the user does not have to learn complex search syntax to differentiate keyword information from semantic information.

Search interface 300 also includes a set of radio buttons 325, with each radio button associated with one or more pre-defined context items. Examples of predefined context items can be date information, geographic information, or any other type of context information. The selected ones of the pre-defined context items, as selected by the set of radio buttons 325, can be communicated with keyword information entered at text entry location 320 and semantic information entered at text entry location 322 as a search term. Thus, the radio buttons provide a convenient way for the user to enter frequently selected or other pre-defined contextual information without having to enter the information manually at the text entry location 322. In an embodiment, the particular context items associated with each button can be configured by the user via a drop-down menu or other selection interface.

The search interface 300 also includes a user profile selection button 328, which results in display of a user profile interface. An example of a user profile interface 400 is illustrated at FIG. 4. In the illustrated embodiment, the user profile interface 400 includes a gender selector 402, a location selector 404, an age range selector 406, and an income range selector 408. The user can enter contextual information about either the user or the intended viewer of a web search by selecting appropriate information via the selectors. Thus, for example, the user can enter contextual information about the user's age using the age range selector 406.

In response to the user entering information at the user profile interface 400, a user profile is stored. The user profile can be stored at the client device 106, at the search engine server 102, or at another location. In response to receiving search teams associated with the user, the search engine server 102 can access the stored user profile for the user and use the contextual information reflected in the profile to search the semantic database 112. Thus, the user profile provides semantic information to augment any semantic information entered by the user via text entry location 322. For example, for any search requested by a user, the search engine server 102 can automatically employ the age of that user as indicated in the associated user profile to search the semantic database 112 and use that semantic information to determine a ranking of search results indicated by a search of the keyword database 110.

Figure 5:
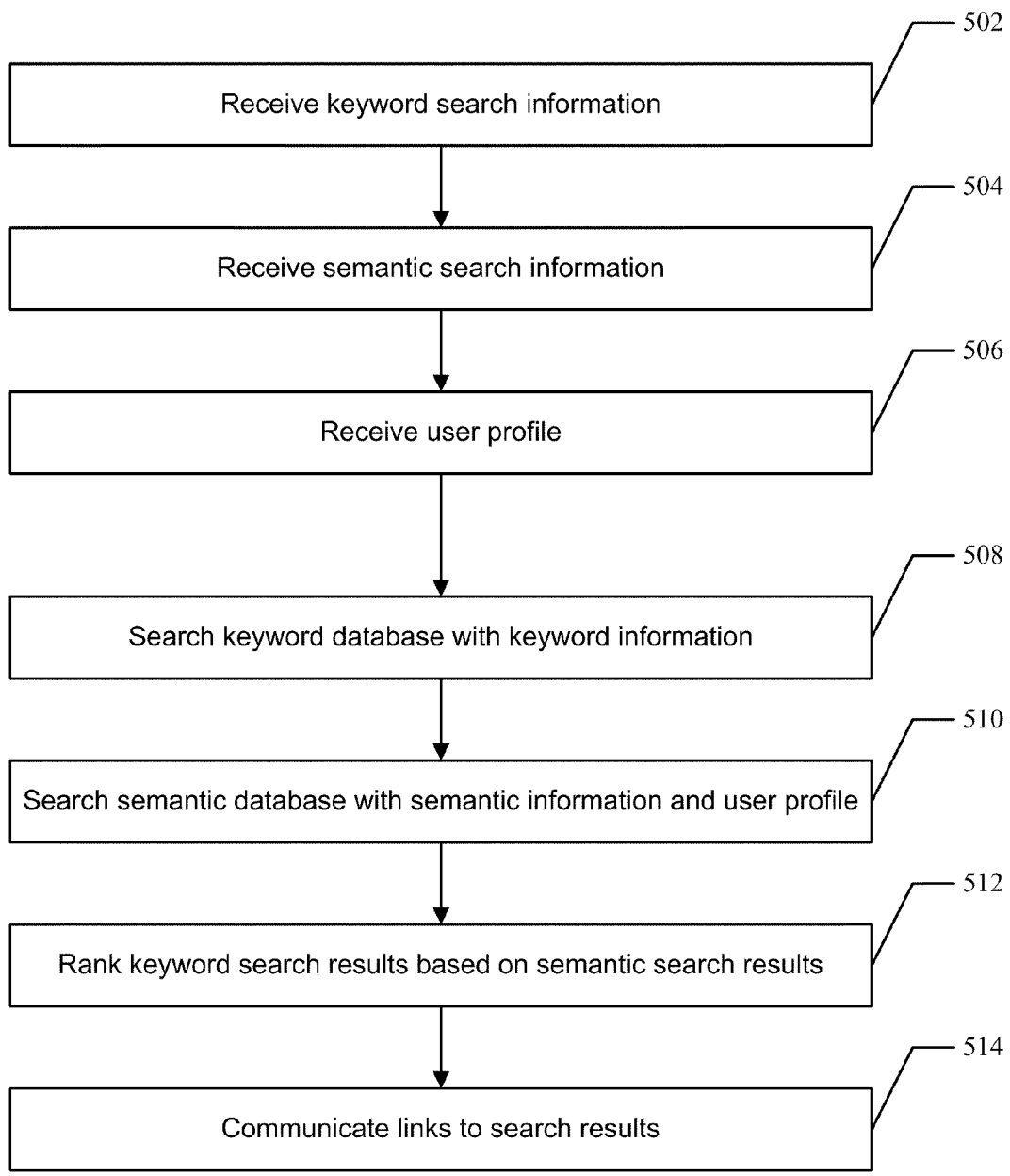
FIG. 5 is a flow diagram of a method of performing a search at a search engine in accordance with one embodiment of the present disclosure.

FIG. 5 illustrates a flow diagram of a method of performing a search for web links at a search engine in accordance with one embodiment of the present disclosure. At block 502, a search engine server receives keyword search information. At block 504, the search engine server receives semantic search information to provide meaning and context to the keyword search. At block 506, the search engine server receives user profile information.

At block 508, the search engine server searches a keyword database using the received keyword information and identifies a set of web pages that display one or more of the keywords indicated by the keyword information. At block 510, the search engine server searches a semantic database using both the received semantic information and the user profile. Based on the results of the search at the semantic database, the search engine server determines which of the web pages indicated by the keyword search results are more likely to be relevant to the user. Accordingly, at block 512 the search engine server ranks the results of the keyword search based on the results of the semantic search. At block 514, the search engine server communicates the ranked list of search results to the device that requested the search. The search results are communicated such that the rank listed is display with web pages more likely to be relevant to the search are displayed more prominently than web pages less likely to be relevant.

Figure 6:
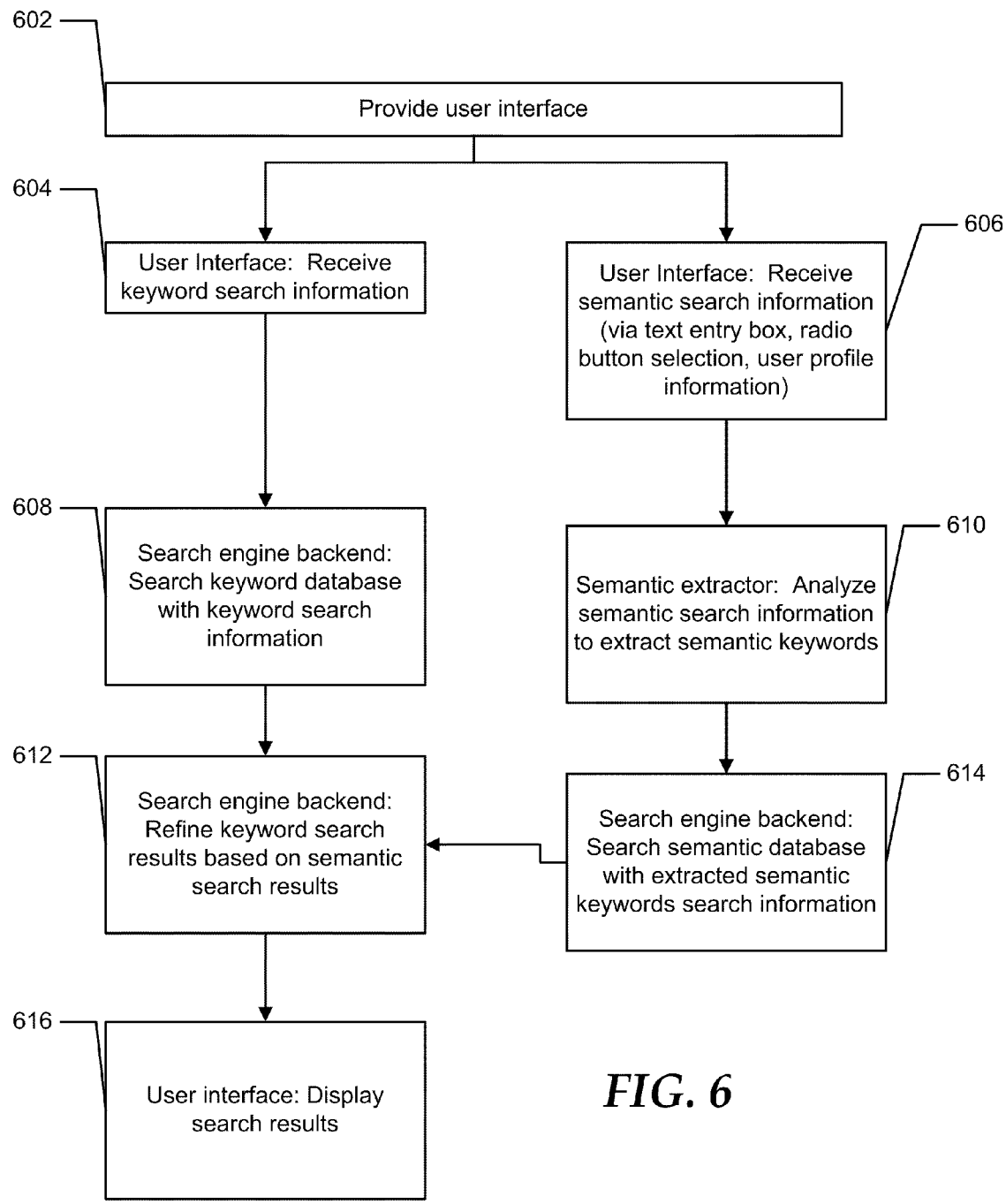
FIG. 6 is a flow diagram of a method of performing a search at a search engine in accordance with another embodiment of the present disclosure.

FIG. 6 illustrates a flow diagram of a method of performing a search for web links at a search engine in accordance with another embodiment of the present disclosure. At block 602, a search engine server provides a user interface via a web page or other web entity. At block 604, the user enters keyword search information via a text entry box or other input module at the user interface, and the keyword search information is communicated to a search engine backend at the search engine server. In addition, at block 606, the user enters semantic search information, including contextual information, at the user interface. The semantic search information can be entered via a text entry box, via radio selection buttons of user-configurable pre-defined semantic search terms, via user profile information, via another input module, or any combination thereof. The semantic search information is communicated to the search engine backend.

At block 608, the search engine backend searches a keyword database using the keyword search information. In addition, at block 610 a semantic extractor module analyzes the semantic search information to determine set of semantic keywords. In an embodiment, the semantic keywords different from the particular terms used to communicate the semantic search information. At block 614, the search engine backend uses the extracted semantic keywords to search a semantic database. In response, the semantic database can provide a set of identifiers for web entities having metadata or other information associated with the semantic keywords.

At block 612, the search engine backend refines the results of the keyword search of the keyword database using the search results from the semantic database. For example, the search engine backend can set the order of display of the keyword search results based on the semantic search results, can filter out or remove keyword search results, or the like. At block 616 the user interface displays links to web entities indicated by the refined keyword search results.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGS. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not

What is claimed is:

1. A method, comprising:
   receiving, at a computer device, first information comprising a keyword;
   receiving second information comprising first semantic information, the second information different from the first information, wherein the first semantic information comprises age and gender information associated with a user, wherein the first semantic information further comprises a microformat, a metatag, and an annotation;
   extracting a set of semantic keywords from the first semantic information, wherein the set of semantic keywords are different from terms that are used to communicate the second information comprising the first semantic information;
   searching a first database with the first information, the first database comprising information displayed at web pages;
   searching a second database with the second information and using the set of semantic keywords extracted from the first semantic information, the second database comprising second semantic information about the web pages;
   identifying a first web entity based on searching the first database using the keyword and based on determining that the first web entity displays the keyword;
   providing a link to the first web entity based on identifying the first web entity in response to searching the first database, based on determining that the first web entity displays the keyword, and based on identifying the first web entity in response to searching the second database, wherein the first web entity is identified in response to searching the second database based on the age and gender information in the second information and based on the set of semantic keywords extracted from the first semantic information;
   updating, at the second database, third semantic information associated with the first web entity based on metadata associated with a different web entity; and
   ranking first search results returned from searching the first database with the keyword, wherein the first search results are ranked based on second search results returned from searching the second database using the set of semantic keywords.

2. The method of claim 1, wherein the first information and second information are entered at a web page comprising a search engine interface.

3. The method of claim 1, wherein the second information comprises contextual information for the first information that indicates a characteristic of the user.

4. The method of claim 1, wherein the second database is based on first annotation information for the first web entity and wherein the first annotation information is not displayed at a web page associated with the first web entity.

5. The method of claim 1, wherein searching the second database comprises identifying the first web entity based on the third semantic information associated with the first web entity and fourth semantic information associated with a second web entity different from the first web entity.

6. The method of claim 1, further comprising receiving third information indicative of a user profile, and wherein providing the link comprises providing the link based on identifying the first web entity in response to searching the second database based on the third information.

7. A method, comprising:
   communicating for display, at a computer device, first information associated with a web search interface, the first information representing a first text entry location;
   communicating for display, at the computer device, second information associated with the web search interface representing a second text entry location;
   communicating third information for display, at the computer device, indicating that the first text entry location is associated with keyword searches and that the second text entry location is associated with first semantic information related to the keyword search;
   receiving first search information entered at the first text entry location, wherein the first search information comprises a keyword;
   receiving second search information entered at the second text entry location, wherein the second search information comprises second semantic information that comprises age and gender information associated with a user, wherein the second semantic information further comprises a microformat, a metatag, and an annotation;
   extracting a set of semantic keywords from the first semantic information, wherein the set of semantic keywords are different from terms that are used to communicate the second search information comprising the second semantic information;
   searching a first database based on the first search information and using the set of semantic keywords extracted from the first semantic information, the first database comprising text information displayed at a web entity;
   searching a second database based on the second information, the second database comprising third semantic information associated with the web entity;
   identifying the web entity based on searching the first database using the keyword and based on determining that the web entity displays the keyword;
   determining a link to the web entity based on identifying the web entity in response to searching the first database, based on determining that the web entity displays the keyword, and based on identifying the web entity in response to searching the second database, wherein the web entity is identified in response to searching the second database based on the age and gender information in the second information and based on the set of semantic keywords extracted from the first semantic information;
   communicating the link for display at the computer device;
   updating the third semantic information associated with the web entity based on metadata associated with a different web entity; and ranking first search results returned from searching the first database with the keyword, wherein the first search results are ranked based on second search results returned from searching the second database using the set of semantic keywords.

8. The method of claim 7, wherein the first semantic information related to the keyword search is not displayed at the web entity.

9. The method of claim 7, further comprising:
communicating fourth information associated with the web search interface, the fourth information representing a user profile interface;
receiving third search information based on the user profile interface; and
determining the web entity based on identifying the web entity in response to searching the second database based on the third search information.

10. The method of claim 9, wherein determining the web entity comprises:
searching a second database based on the second information and based on the third information, the second database comprising the third semantic information associated with the web entity.

11. A device, comprising:
a network interface that receives first information comprising a keyword and second information comprising first semantic information, the second information different from the first information, wherein the first semantic information comprises age and gender information associated with a user, wherein the first semantic information further comprises a microformat, a metatag, and an annotation;
a first database comprising textual information displayed at web entities;
a second database comprising second semantic information about the web entities; and
a control module comprising a processor that performs operations comprising:
extracting a set of semantic keywords from the first semantic information, wherein the set of semantic keywords are different from terms that are used to communicate the second information comprising the first semantic information;
searching the first database with the first information and the second database with the second information and the set of semantic keywords extracted from the first semantic information;
identifying a first web entity of the web entities based on searching the first database using the keyword and based on determining that the web entity displays the keyword;
providing a link to the first web entity of the web entities based on identifying the first web entity in response to searching the first database, based on determining that the first web entity displays the keyword, and based on identifying the first web entity in response to searching the second database, wherein the first web entity is identified in response to searching the second database based on the age and gender information in the second information and based on the set of semantic keywords extracted from the first semantic information;
updating, at the second database, third semantic information associated with the first web entity based on metadata associated with a different web entity; and
ranking first search results returned from searching the first database with the keyword, wherein the first search results are ranked based on second search results returned from searching the second database using the set of semantic keywords.

12. The device of claim 11, wherein the first information and second information are entered at a web page comprising a search engine interface.

13. The device of claim 11, wherein the operations further comprise determining the first web entity of the web entities based on the third semantic information associated with the first web entity of the web entities and fourth semantic information associated with a second web entity of the web entities different from the first web entity.

14. The method of claim 1, further comprising suppressing display of a link to a second web entity based on:
identifying the second web entity in response to searching the first database; and
not identifying the second web entity in response to searching the second database.

15. The method of claim 1, wherein the metadata is provided at the second web entity but is not displayed at a web page corresponding to the second web entity.

16. The method of claim 1, wherein the second database includes information associating a second web entity with the first web entity.

17. The method of claim 7, wherein the second database includes information associating a second web entity with the first web entity.

18. The device of claim 11, wherein the second database includes information associating a second web entity with the first web entity.

19. The device of claim 11, wherein the second semantic information about the web entities provided by the second database comprises identifying a relationship between the identity of the first web entity and corresponding metadata associated with the first web entity, the metadata provided at the first web entity but not displayed at a web page corresponding to the first web entity.

* * * * *